United States Patent [19]

Moriguchi et al.

[11] 4,410,897
[45] Oct. 18, 1983

[54] TWO-SIDED RECORDING DEVICE

[75] Inventors: Haruhiko Moriguchi; Yoshiki Kikuchi; Takashi Ohmori, all of Kanagawa, Japan

[73] Assignee: Fuji Xerox Co., Ltd., Tokyo, Japan

[21] Appl. No.: 312,019

[22] Filed: Oct. 16, 1981

[30] Foreign Application Priority Data

Oct. 17, 1980 [JP] Japan ................................. 55-144428

[51] Int. Cl.³ ...................... G01D 15/10; G03B 27/32
[52] U.S. Cl. .................................. 346/76 PH; 355/23
[58] Field of Search ............ 346/76 R, 76 PH, 140 R, 346/135.1, 1.1; 355/23, 24

[56] References Cited

U.S. PATENT DOCUMENTS

| 3,580,670 | 5/1971 | Bhagat | 355/23 X |
| 3,743,408 | 7/1973 | Ohno | 355/16 X |
| 3,792,481 | 2/1974 | Nagashima et al. | 346/76 R X |
| 3,797,926 | 3/1974 | Fotland et al. | 355/16 X |
| 3,936,171 | 2/1976 | Brooke | 355/23 X |
| 4,205,320 | 5/1980 | Fujii | 346/1.1 |

OTHER PUBLICATIONS

I.B.M. Technical Disclosure Bulletin, vol. 18, No. 8, Jan. 1976.

Primary Examiner—Donald A. Griffin
Attorney, Agent, or Firm—Sughrue, Mion, Zinn, Macpeak and Seas

[57] ABSTRACT

A two-sided image recorder employs thermal printing heads and respective ink donor sheets contacting opposite sides of a recording paper as the paper makes a single pass through the recording paper passage.

7 Claims, 3 Drawing Figures

TWO-SIDED RECORDING DEVICE

BACKGROUND OF THE INVENTION

This invention relates to a recorder for use in a printer, facsimile or the like, for recording images on both sides of a recording medium.

A conventional system for recording desired images on both sides of a recording medium, such as a recording paper sheet, is shown in FIG. 1. An image is recorded at point 6 on one side of a recording sheet fed from a recording sheet feed tray 1. The recording sheet then travels via a passage 3 to a reversing tray 2, with the recorded side thereof directed upward. The recording sheet is then discharged from the reversing tray to travel via a passage 4 to the point 6, at which an image is recorded on the other side of the recording sheet. Finally, the recording sheet having images on both sides thereof travels via passage 5 to be delivered to a discharge tray 7.

The above described system has often been adopted for Xerography, but has suffered from many drawbacks, such as requiring a device which is complicated in construction, and hence costly, and its performance reliability is poor. Furthermore, the system sometimes fails to record images on both sides of a sheet.

SUMMARY OF THE INVENTION

It is an object of the present invention to provide a two-sided recorder, which is simple in construction and which permits images to be recorded on both sides of a desired recording medium at high speed.

The two-sided recorder according to the present invention comprises thermal recording sheet passage, and a thermally fusible ink transporting means, such as an ink donor sheet or an ink supply system, whereby picture signals are applied to the thermal recording heads, thereby recording images on both sides of a desired recording medium at high speed.

BRIEF DESCRIPTION OF THE DRAWINGS

The present invention will be described in more detail with reference to the accompanying drawings, in which.

DETAILED DESCRIPTION OF THE INVENTION

Figure 1:
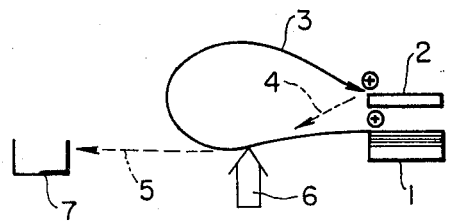
FIG. 1 is a schematic view of a conventional two-sided recorder.
Figure 2:
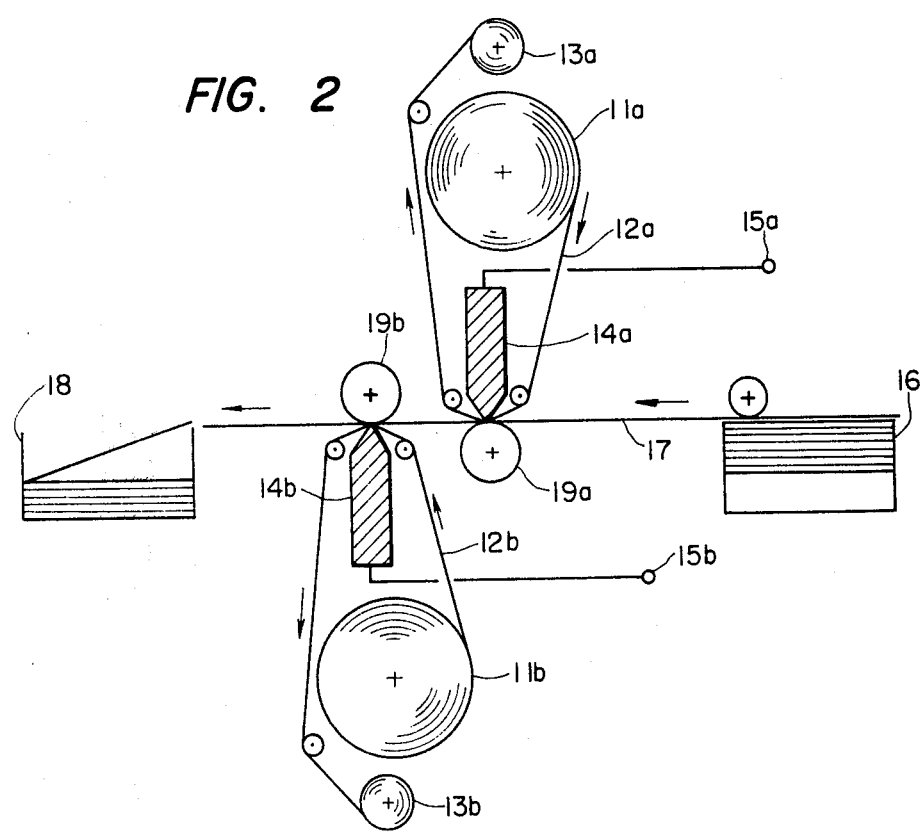
FIG. 2 is a schematic view of a recorder according to a first embodiment of the present invention.

In FIG. 2, 11a and 11b are ink donor sheet feed rolls, 12a and 12b are thermally fusible ink donor sheets, 13a, 13b are take-up rolls, 14a and 14b are thermal recording heads, 15a and 15b are terminals to which electric signals are to be applied, 16 is a recording sheet feed tray, 17 is a recording sheet transporting path, 18 is a recorded sheet tray, and 19a and 19b are back rolls for each of the recording heads.

In operation, ink donor sheet 12a and 12b are unwound from the ink donor sheet rolls 11a and 11b, pass through the contacting portion between the thermal recording head 14a and the back roll 19a and the contacting portion between the thermal recording head 14b and the back roll 19b, respectively, and are wound onto the take-up rolls 13a and 13b, respectively. Picture signals are applied to terminals 15a and 15b, and the thermal recording heads 14a and 14b convert the picture signals into heat energy. A recording sheet is fed from the recording sheet feed tray 16, and travels in succession through the contacting portion between the thermal recording head 14a and its back roll 19a and the contacting portion between the thermal recording head 14b and its back roll 19b to the recorded sheet tray 18.

An image is recorded on one side (top surface) of the recording sheet by the cooperation of the thermal recording head 14a and the ink donor sheet 12a, and an image is recorded on the other side (reverse surface) of the sheet by the thermal recording head 14b and the ink donor sheet 12b. The procedure for transferring ink from the ink donor sheet to the recording medium is known in the art, and hence no description need be provided herein.

In this embodiment, the recording of an image on the other side of the recording sheet is conducted at a given time interval after an image has been recorded on the one side of the sheet. In order to start recording at the same points on both sides of the recording sheet, the distance from the first recording head-back roll contact point to the second recording head-back roll contact point must be measured beforehand, so as to control the timing at which respective picture signals are applied to the first recording head and the second recording head.

Figure 3:
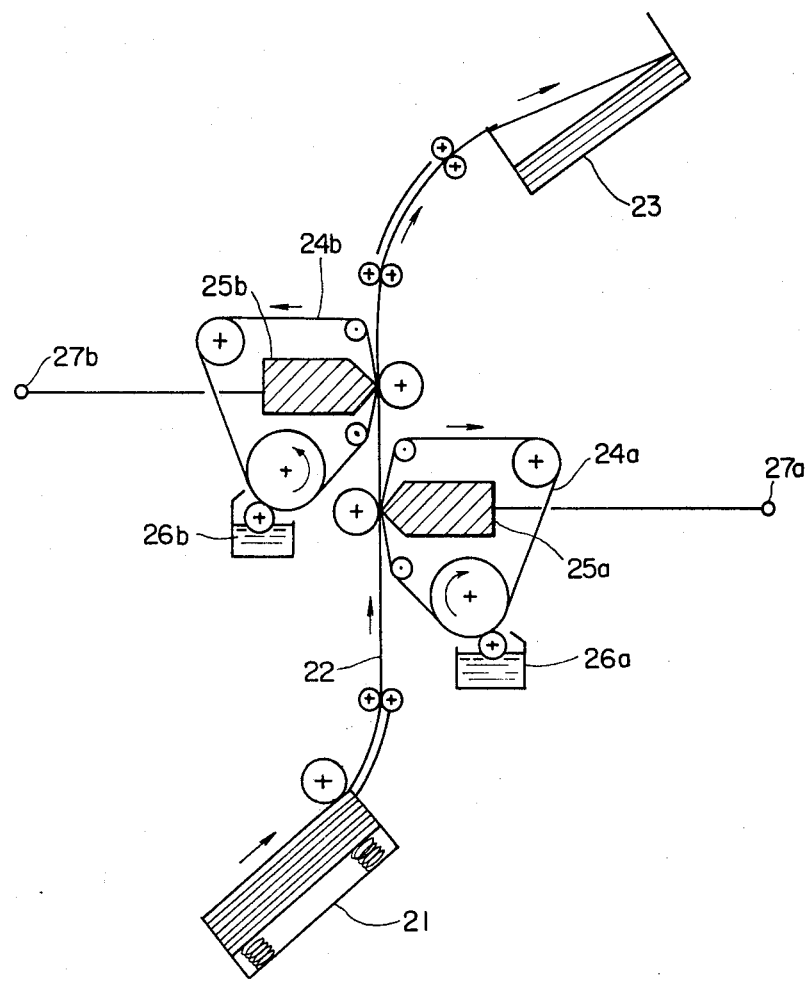
FIG. 3 is a schematic view of a recorder according to a second embodiment of the present invention.

FIG. 3 shows a recording device according to a second embodiment of this invention. In FIG. 3, 21 is a recording sheet feed tray, 22 a recording sheet transporting passage, 23 a recorded sheet tray, 24a and 24b ink donor belts, 25a and 25b thermal recording heads, 26a and 26b ink feed devices, and 27a and 27b terminals to which electric signals are to be applied. The second embodiment differs from the first embodiment in that the ink feed systems are provided in place of ink donor sheets, so as to continually apply ink to the ink donor belts 24a and 24b.

In each of these embodiments, when it is desired to record an image of a different color on either side of the recording sheet, it is only necessary to apply ink of a different color to the ink donor sheet or ink donor belt disposed on each side of the recording sheet passage. When it is desired to record an image on only one side of a recording sheet, picture information data are applied only to the thermal recording head which faces the one side of the recording sheet on which an image is to be recorded.

According to the present invention, two-sided recording is easily accomplished by providing thermal recording heads and thermally fusible ink transporting means such as ink donor sheets or ink donor belts on the both sides of a recording sheet passage. The recording sheet need not be reversed as in the conventional recorder. This recorder is simple in construction and permits the recording of images on both sides of a desired recording medium at high speed.

What is claimed is:

1. A two-sided image recording apparatus, comprising:
   means for defining a recording sheet passage through which a recording sheet having first and second surfaces passes;
   first and second fixed thermal recording heads disposed on opposite sides of said passage so as to be adjacent said first and second surfaces, respectively, of said recording sheet as said recording sheet passes through said passage;

ink donor sheet supply means for supplying first and second ink donor sheets having thermally fusible ink thereon so that said first and second ink donor sheets contact against said first and second surfaces, respectively, during a single passage of said recording sheet through said recording sheet passage;

said first thermal recording head being selectively heated, in accordance with image signals applied thereto, to heat said first ink donor sheet contacting said first surface to transfer thermally fusible ink to said first surface to form an image thereon;

said second thermal recording head being selectively heated in accordance with image signals applied thereto, to heat said second ink donor sheet contacting said second surface to transfer thermally fusible ink to said second surface to form an image thereon; and means for applying image signals to said first and second thermal recording heads to record images on both of said first and second surfaces during a single pass of said recording sheet through said recording sheet passage.

2. A two-sided image recording device as claimed in claim 1 wherein said ink donor sheet supply means comprises:

first ink donor sheet transport means for transporting said first ink donor sheet past said first thermal recording head while in contact with said first surface; and a second ink donor sheet transport means for transporting said second ink donor sheet past said second thermal recording head while in contact with said second surface.

3. A two-sided image recording device as claimed in claim 2, wherein said first and second thermal recording heads contact said first and second surfaces at respecting locations which are displaced along said recording sheet passage.

4. A two-sided image recording device as claimed in claim 2, wherein said first and second ink donor sheets are of different colors.

5. A two-sided image recording device as claimed in claim 2, wherein at least one of said ink donor sheet transport means comprises:

an ink donor sheet in the form of a continuous belt;

drive means for driving said belt along a belt path wherein one surface of said belt contacts a surface of said recording sheet in the vicinity of a thermal recording head; and means disposed along said belt path for applying ink to said one surface of said belt.

6. A two-sided image recording device as claimed in claim 2 wherein said first and second ink donor sheet transport means includes separate sets of first and second rollers for guiding said first and second ink donor sheets to and away from said first and second surfaces, respectively, and third and fourth rollers disposed opposite said first and second thermal recording heads, said third roller being positioned so as to maintain contact between said first ink donor sheet, said first surface, and said first thermal recording head, and said fourth roller being positioned so as to maintain contact between said second ink donor sheet, said second surface, and said second thermal recording head.

7. A two-sided image recording device as claimed in claim 2, wherein at least one of said ink donor sheet transport means comprises:

an ink donor sheet feed roll having an ink donor sheet wound thereon;

an ink donor sheet take-up roll; and means for guiding said ink donor sheet from said feed roll to said take-up roll.

* * * * *